United States Patent [19]

Romeyke et al.

[11] 4,214,436
[45] Jul. 29, 1980

[54] THRUST COMPENSATION AND COOLING SYSTEM FOR GAS TURBINES

[75] Inventors: Norbert Romeyke, Lampertheim; Richard Kalbfuss, Mannheim, both of Fed. Rep. of Germany

[73] Assignee: BBC Brown, Boveri & Co., Ltd., Baden, Switzerland

[21] Appl. No.: 918,155

[22] Filed: Jun. 22, 1978

[30] Foreign Application Priority Data

Jun. 24, 1977 [DE] Fed. Rep. of Germany ....... 2728400

[51] Int. Cl.² .......................... F02C 7/02; F02C 7/18
[52] U.S. Cl. .............................. 60/39.09 R; 60/39.17; 60/39.75; 415/107
[58] Field of Search ............... 415/104, 107, 116, 117, 415/175; 60/39.02, 39.09 R, 39.07, 39.17, 39.23, 39.65, 39.66, 39.75

[56] References Cited

U.S. PATENT DOCUMENTS

| | | | |
|---|---|---|---|
| 1,988,456 | 1/1935 | Lysholm | 60/39.55 |
| 2,614,799 | 10/1952 | Judson et al. | 60/39.17 |
| 2,647,684 | 8/1953 | Lombard | 415/104 |
| 2,779,531 | 1/1957 | Wheatley | 415/104 |
| 3,034,298 | 5/1962 | White | 415/116 |
| 3,044,744 | 7/1962 | Berlyn | 415/112 |
| 3,452,542 | 7/1969 | Saferstein et al. | 60/39.66 |
| 3,903,691 | 9/1975 | Szydlowski | 415/116 X |

Primary Examiner—Carlton R. Croyle
Assistant Examiner—Edward Look
Attorney, Agent, or Firm—Burns, Doane, Swecker & Mathis

[57] ABSTRACT

A gas turbine is disclosed having at least one turbine stage with hot gas flowing axially through the one stage. At least one balance piston is provided on the shaft to equalize an axial thrust and is located adjacent to at least a first pressurized fluid chamber. The first pressurized fluid chamber is adjacent to a hot gas intake of the turbine stage and is separated from at least a second pressurized fluid chamber by a first transfer gasket co-acting with the balance piston. Pressurized fluid within the first fluid chamber has a pressure greater than the pressure of the hot gas in the vicinity of a hot gas intake. A cooling system is connected to the second fluid chamber for supplying a cooling fluid. A slot of the first transfer gasket is selected so that a pressure difference between the first and second fluid chambers at least partially brings the axial thrust into equalization through the balance piston.

21 Claims, 2 Drawing Figures

THRUST COMPENSATION AND COOLING SYSTEM FOR GAS TURBINES

BACKGROUND AND SUMMARY OF THE PRESENT INVENTION

The present invention relates generally to a gas turbine, and more particularly relates to a gas turbine for an air storage facility having at least one turbine stage through which axially flows a, preferably hot,, power gas and with at least one balance piston to equalize an axial thrust. The balance piston is arranged at the shaft of the turbine adjacent to a plurality of pressurized-fluid chambers.

To equalize the axial thrust, gas turbines often have shaft balance pistons which will compensate, or at least substantially compensate, for the axial thrust occurring during operations by correspondingly pressure loading the piston areas. In this way, the existing axial bearings are unburdened. It is also known to cool the parts of gas turbines which are under high thermal stresses such as for example, the supports of the entrance blades and/or the guide vanes.

It is an object of the present invention to provide a gas turbine having an efficient thrust-balancing and cooling system which needs a minimum of structural components and has a low power-loss factor. Such a gas turbine should also be very reliable in operation and should satisfy all requirements arising in the course of gas turbine operations.

The present invention solves this problem by having a first pressurized fluid chamber being arranged adjacent to the power-gas intake of the turbine stage and separated from at least one additional pressurized fluid chamber by means of a first transfer gasket which interacts with the balance piston. The first fluid pressure chamber can be provided with a gaseous pressure fluid, preferably with air, having a pressure that is higher than the pressure of the power gas within the region of the power-gas intake. At least one cooling system of the gas turbine is connected to the additional pressurized fluid chamber for the delivery of a coolant. A slot of the first transfer gasket is selected in such manner that the pressure difference between the fluid pressure chambers can be set to bring about an at least partial equalization of the axial thrust by way of the balance piston.

The individual fluid pressure chambers, which are adjacent to the balance piston, are loaded in succession by the pressurized fluid being delivered, with the pressurized fluid flowing by way of the slot of the transfer gasket from one fluid pressure chamber to another fluid pressure chamber.

Since the coolant for the cooling system is taken from the fluid pressure chamber which is arranged successively to the balance piston, a pressure gradient will arise between the fluid pressure chambers. This pressure gradient will cause, in co-action with the balance piston, the equalization of the axial thrust. Since the pressurized fluid after flowing through the fluid pressure chambers, is conveyed to the cooling system or systems having a coolant deficiency, a simple coolant supply is being insured. Furthermore, the pressurized fluid is being additionally utilized as a coolant. The use of the slot of the transfer gasket for the adjustment of the fluid pressure flow and accordingly of the pressure gradient eliminates the need for any additional throttling elements so that the gas turbine of the present invention has a simplified overall layout.

The transfer gaskets of the present invention include but are not liminted to contact-free seals or sealing arrangements such as split seals, labyrinth seals or combined slot-labyrinth seals.

If the gas turbine has several turbine stages and balance pistons, it will be advantageous to provide several additional fluid pressure chambers arranged in series. Each chamber is adjacent to an additional balance piston and is separated from each other by an additional transfer gasket which co-acts with an additional balance piston. In this way, the cooling system is connected to one of the additional fluid pressure chambers and the slots of the transfer gaskets are selected so that a pressure difference can be set in such a manner between the pressure-medium chambers that it will, at least partially, equalize the axial thrust.

All fluid pressure chambers are connected in series and are subjected to a flow-through by the pressurized fluid so that pressure is exerted upon each of the balance pistons. These individual pressures will collectively bring about the thrust equalization. In this way, the cooling system is connected to one of the pressurized fluid chambers. It will be advantageous if the cooling system is also provided for a turbine stage that follows the first turbine stage. It will further be advantageous to assign one cooling system to one of the successively arranged turbine stages and to connect it in each situation to one of the additional fluid pressure chambers.

An especially preferred further development of the invention consists of an arrangement wherein the cooling system of the second turbine stage is connected to the second fluid pressure chamber and wherein the cooling system of the third turbine stage is connnected to the third fluid pressure chamber and so on as viewed and counted from the power-gas intake.

If the cooling system is connected to a fluid pressure chamber which is formed with the aid of two balance pistons, it will be advantageous, for the purpose of insuring a fluid pressure flow up to and into the final fluid pressure chamber, to connect the last fluid pressure chamber with a waste gas duct. Since the gas pressure within this duct represents the lowest gas pressure of the turbine system, a pressure gradient from the first up to the last fluid pressure chamber will be insured.

Another expedient further development of the present invention is an arrangement wherein the first fluid pressure chamber forms in conjunction with the area enclosing the first turbine stage a single unit of volume, thus simplifying the layout as well as the cooling of the first turbine stage.

If air is used as the pressurized fluid, the hot power gases produced in the combustion chambers can be utilized in a very simple manner by connecting the first fluid pressure chamber with the compressed-air supply for the combustion chamber of the first turbine stage. In this way, a fluid pressure flow is obtained. It will be very expedient in this case to install a heat exchanger between the first pressure-medium chamber and the compressed-air supply. The heat exchanger is preferably placed within the exhaust flow of the gas turbine. In this manner the air provided as pressurized fluid is being pre-heated so that sudden changes in temperature within the turbine are avoided and a uniform heating of the loaded turbine parts is promoted.

In order to protect the cooling system from excess pressures which could occur in case of excessive venting by the transfer gaskets of the balance pistons, it will be advantageous to equip the cooling system with at least one adjustable safety valve which will connect the cooling system with a bridging area if the pressure difference goes beyond a pre-set value. The blowoff from the safety valve will enter a bridging area which connects two turbine stages at their gas sides so that the opening of the safety valve will only lead to very minor power losses.

In order to insure a sufficient supply of coolant, it will be advantageous to provide the cooling system with at least one adjustable by-pass valve which is located within a pipe line connecting the cooling system and the pressurized fluid duct and which will open if the pressure difference between the cooling system and the bridging area drops below a pre-set value. This measure will prevent any deficiency of coolant within the cooling system.

The gas turbine may comprise at least one air-cooled combustion chamber for the first turbine stage arranged at the turbine housing. In such an arrangement, an especially preferred further development of the invention is then characterized by the features that the single unit of volume is traversed by a transition piece leading to the heating gas intake of the first turbine stage, entering in telescopic fashion and forming an air gap in the open end of the first combustion chamber. Furthermore, the single unit of volume is sealed off by at least two throttles from the air space which surrounds the combustion chamber and can be charged by the air of combustion. The throttles are placed in series within the air space and define a special area, with the air gap leading into this area.

Such an arrangement makes possible a cooling of the transition piece carrying the hot power gases. Having the transition of the combustion chamber end connected to the transition piece in telescopic fashion will allow the expansion of these parts independently of each other. Since the air space surrounding the combustion chamber is sealed off only by two throttles which are arranged one after another at a distance within the air space, the air or coolant supply reaching the special area will be sufficient for the cooling of the sealing sites. Furthermore, since the transition piece ends within the special area, air or coolant respectively will be drawn in through the air gap from the special area into the transition piece due to an injector effect of the combustion-chamber flow. The quantity of air or coolant joining the power gas flow is not controlled at all by the size of the air gap but is solely determined by the venting capability of the throttles. The size of the air gap can therefore be chosen exclusively on the basis of structural aspects.

A particularly simple construction will be feasible if the first throttle, which is located adjacent to the single unit of volume, has the shape of a flat annular body that embraces and is fastened to the transition piece. Furthermore, the first throttle engages a ring-gap of an outer ring with a first throttle-gap between the outer ring and the outer wall of the air space being left unobstructed. The outer ring consists of at least two ring segments which are joined to each other by a connecting ring. This structural design makes it possible to keep the free space of the air gap to a minimum despite the wide differences in heat expansion between the turbine housing and the transition piece. An adjustment of the size of the throttle gap is made possible at the time of assembly in accordance with the specific requirements by the proper selection of the ring segments.

The other throttle can be formed by a plain ring-gap between the combustion chamber wall and a flat ring supported by the outer wall of the air space because these components are subjected to substantially identical temperatures at like times. Accordingly, wide differences in heat expansion therefore do not arise. It will be advantageous, however, if the second throttle is provided with a second throttle-gap. The second throttle-gap is formed between the combustion chamber wall and a cylindrical hollow body which surrounds the combustion chamber wall and is supported by an annular partition traversing the air space and fastened to the outer wall of the air space. It will be expedient to arrange the hollow body between the combustion chamber wall and the widened upper end of the transition piece.

Another preferred further development of the invention is represented by an arrangement where, following the cut-off of the power gas supply, the turbine stages and the last guide vane set of the last turbine stage can be supplied individually or in combination with a gaseous cooling fluid to dissipate the windage heat which is building up during the deceleration of the turbine.

If the gas turbine is equipped with an air storage unit, it will be advantageous to utilize compressed air, withdrawn from the air storage unit, as the cooling fluid.

BRIEF DESCRIPTION OF THE DRAWINGS

Additional advantages of the present invention will become apparent from the following description of a practical example in connection with the appended drawings wherein like members bear like reference numerals, and wherein.

DETAILED DESCRIPTION OF THE PREFERRED EMBODIMENT

Figure 1:
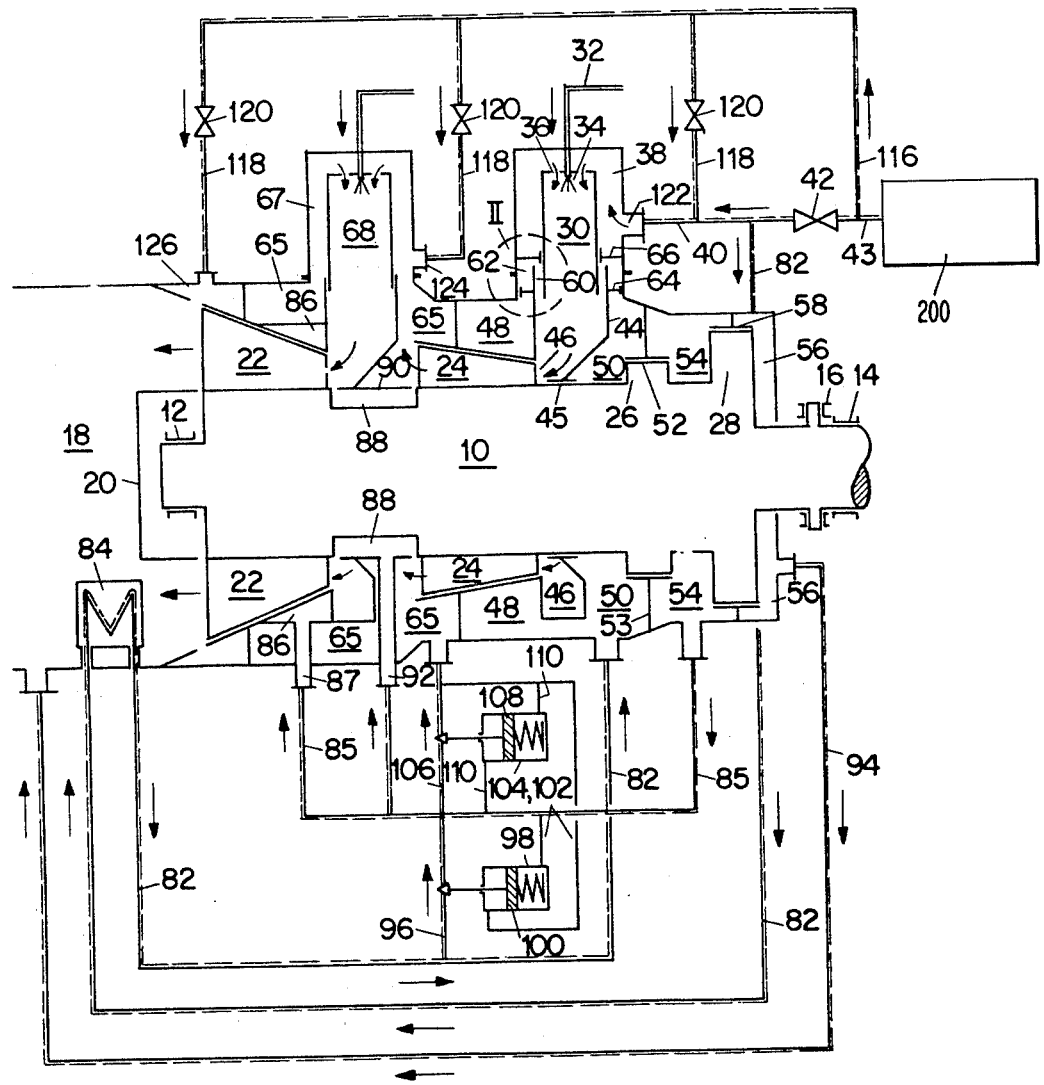
FIG. 1 is a cross sectional view of a two-stage gas turbine having combustion chambers arranged at the turbine housing; and, FIG. 2 is an enlarged cross sectional view of a portion II of FIG. 1.

A gas turbine, with reference to FIG. 1, has a shaft 10 having left and right shaft ends which are cranked and supported by bearings. The bearings are formed on both sides by radial ball bearings 12, 14. An additional axial ball bearing 16 is used for the shaft end at the right. For the purpose of utilizing the turbine output, the right end of the shaft can be connected, for example to an electric generator (not illustrated).

Since the radial ball bearing 12 at the left is located within the exhaust passage 18, it is protected from the exhaust gas by a cover 20.

Within the area of the left shaft end there is arranged a blading of a second turbine stage 22 which includes guide vanes and entrance blades. A flow-through of the stage runs axially from right to left. At a distance from the second turbine stage there is located a first turbine stage 24, again designed for an axial flow-through from the right to the left. Following the first turbine stage 24 there is arranged at the shaft 10 a first balance piston 26 which consists of a disk-shaped annular body placed concentrically to the shaft.

The balance piston is either fastened to the shaft or forms a structural unit with the shaft. A second balance piston 28 is located at the right end of the shaft and is designed and fastened to the shaft in the same manner as the first balance piston 26. In FIG. 1, a two-stage gas turbine is illustrated and therefore only two balance pistons are provided. The second balance piston 28 accordingly represents the last balance piston.

The first turbine stage 24 is supplied with power gas by a first combustion chamber 30 which is arranged at the turbine housing in a radial direction relative to the shaft. At an upper, closed-off end of the first combustion chamber 30, a fuel nozzle 34 is located and is connected to the fuel supply line 32. Air-supplying apertures 36, leading to the air space 38, are also provided at the upper closed off end. The combustion chamber 30, has a circular profile and is surrounded at an outside by an air space 38. The air space 38 has an area shaped in the form of an annulus which is connected to a compressed-air supply line 40. The supply line 40 is preferably connected by a line 43 and by way of a number of air-controlling and regulating units (by one single valve 42 in FIG. 1) to a compressed air storage unit 200 or to some other source of compressed air, for example, to a compressor.

The open end of the combustion chamber 30 is inducted into the transition piece 44 in a telescopic fashion so that an air gap 60 in the form of an annulus is created between these two parts. The air gap 60 ends at a special area 62, formed between two throttles 64 and 66 which separate the air space 38 from the single air space 48, 50.

At the lower end of the cylindrical combustion chamber 30 which extends in a radial direction approximately up to the turbine housing there is connected a tubular transition piece 44 which tapers in a downward direction. The transition piece 44 connects the combustion chamber 30 with the power gas intake 46 of the first turbine stage 24. The power gas intake 46 includes a circular, cylindrical hollow body which surrounds the shaft 10 and which is open toward a blading of the first turbine stage 24 and toward the shaft 10. The power gas intake 46 is sealed from a pressurized fluid chamber 50 by a transfer gasket 45 placed between the shaft 10 and the hollow body.

The transition piece 44 covers an area that is formed by the outer area 48 and by the first pressurized fluid chamber 50. The so-called pressurized fluid/outer area unit of volume 48, 50, is hereinafter referred to as single unit of volume 48, 50. The outer area 48 surrounds, in the form of an annulus, the region of the gas turbine which accomodates the entrance blades of the first turbine stage 24 and is used for cooling. The first pressure medium chamber 50 surrounds the shaft 10 substantially in the form of an annulus and borders the left frontal area of the first balance piston 26.

Between the first and the second balance piston 26 and 28 respectively there is provided an additional pressurized fluid chamber 54 which surrounds the shaft 10 in the form of an annulus and which borders on the left frontal area of the second balance piston 28. Finally, there is located at the right frontal area of the second balance piston 28 a pressurized fluid medium chamber 56 which is also the last pressurized fluid chamber. This last pressurized fluid medium chamber is defined at its outer side by the turbine housing. The shaft 10 is sealed at the area of lead-through in a conventional manner.

The pressurized fluid chambers 50, 54, 56 are sealed from each other by means of a pair of transfer gaskets 52 and 58. These transfer gaskets are in the form of slot seals, with the sealing slots being formed between peripheral surfaces of the balance pistons 26, 28 and counterparts which are supported at the housing. The pressurized fluid chamber 56 is sealed off at the shaft pass-through from the outer area in the same manner.

The outlet side of the first turbine stage 24 is connected to an annular bridging area 65. The bridging area 65 is connected to the second air space 67 surrounding the second combustion chamber 67. The second combustion chamber 68 is substantially identical with the first combustion chamber 30 so far as construction and connections to both the fuel supply and the blading are concerned.

The outlet side of the second turbine stage 22 is connected to the exhaust passage 18 which leads to a chimney (not illustrated).

Figure 2:
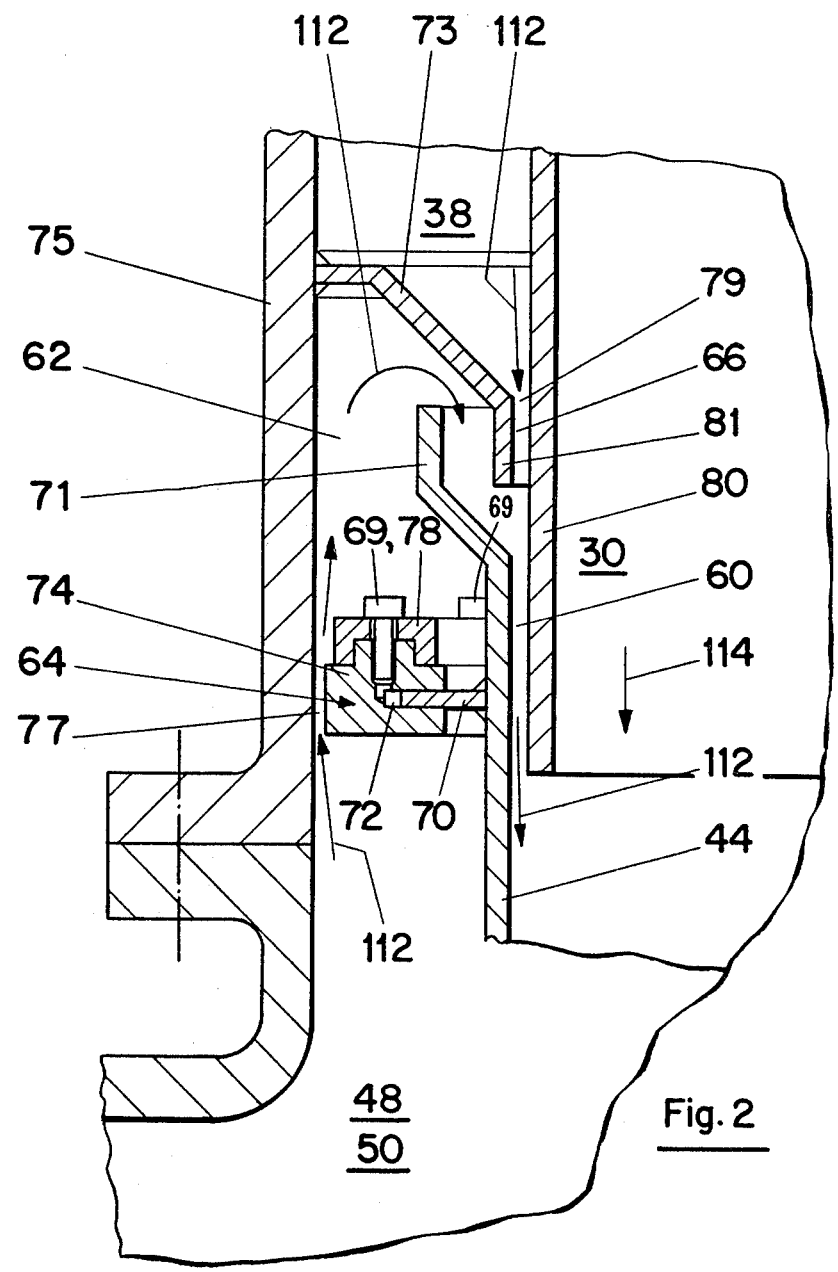

With reference now to FIG. 2 the first combustion chamber 30 ends within the transition piece 44 while forming the air gap 60. The size of the air gap is selected exclusively on the basis of structural aspects. The lower first throttle, adjacent to the single unit of volume 48, 50, consists primarily of a flat annular body 70 which surrounds closely and is fastened to the transition piece 44.

The annular body 70 engages with its outer surface the ring gap 72 of a loose outer ring 74 which has an approximately rectangular profile and which ends in front of the cylindrical outer wall 75 of the air space while forming the annular slot 77 of the first throttle. The outer ring 74 consists of two identical ring segments which are joined together by means of a connecting ring 78 and screws 69. The division of the outer ring 74 into two parts is necessary to permit installation because the outer ring 74 could otherwise not be placed onto the annular body 70 which is fastened to the transition piece by means of welding.

With continued reference to FIG. 2, the upper, second throttle 66 has a thin-walled, circular and cylindrical hollow body 81 which surrounds the combustion chamber wall 80 while forming the slot 79 of the second throttle. The hollow body 81 is fastened at its upper end to a funnel-shaped partition 73 which traverses the air space 38 and which is fastened tightly to the outer wall 75 of the air space. The hollow body 81 is surrounded by the upper end 71 of the transition piece 44. Accordingly, the upper end 71 is widened cylindrically and in a sleeve-like manner so that a ring gap will remain between the hollow body 81 and the upper end 71. The size of the gap is optional with the throttle slots 77 and 79 being dimensioned so that they will just permit the passage of sufficient quantities of air or coolant respectively.

Referring now to FIG. 1, from the compressed-air supply line 40, a pressurized fluid line 82 branches off between the valve 42 and the entry into the air space 38. The line 82 leads to the single unit of volume 48, 50 by way of a heat exchanger 84, arranged within the exhaust passage 18. Since the single unit of volume 48, 50 borders on the base support for the entrance-blades of the first turbine stage 24, on the transition piece 44, on the power gas intake 46 and on the shaft 10, volume 48, 50 forms a substantial portion of the cooling system for the first turbine stage. Other portions of the cooling system are formed by the fluid pressure chambers 54 and 56.

The cooling system for the second turbine stage 22 is connected to the additional second fluid pressure chamber 54, and has a coolant line 85 and a chamber 86 shaped in the form of an annulus and possessing a substantially wedge-shaped profile. The chamber 86 borders on the base support for the entrance blades of the second turbine stage 22 and on the bridging area 65. The coolant line 85 is connected by means of a pipe connection 87 which enters the bridging area 65. The cooling system further includes an annular chamber 88 which borders on the shaft 10 and which extends in an axial direction between the end of the first turbine stage 24 and the beginning of the second turbine stage 22. The annular chamber 88 supplies an additional cooling system (not illustrated) of the second turbine stage which has the task to cool the shaft 10 and the turbine guide vanes. The annular chamber 88 is provided at its outer side with a circular and cylindrical covering 90 which is defined in an axial direction by a plurality of transfer packing boxes so that a specifically defined, and preferably small, quantity of cooling air can enter the bridging area 65 and proceed to the power gas intake of the second turbine stage 22. A pipe junction 92 is carried outwardly for the connection of the annular chamber 88 to the line 85.

Finally, the last fluid pressure chamber 56 is connected with the exhaust passage 18 by way of a pipe line 94.

The portion of the fluid pressure pipe line 82 which is located between the heat exchanger 84 and the single unit of volume 48, 50 is connected with the coolant line 85, leading from the second fluid pressure medium chamber 54 to the pipe connection 87, by means of a junction 96 which has the form of a pipe line into which is inserted a by-pass valve 98. The surge chambers acting upon the spring-loaded piston 100 of the by-pass valve 98 are connected by way of lines 102 with the bridging area 65 and with the coolant line 85 in such manner that the by-pass valve will open when the pressure difference falls below a pre-set value. If this occurs, the coolant line 85, and thus the cooling system 85, 86, 88 will be supplied directly with cooling air, with the pressure-medium chambers 50 and 54 being by-passed. In this manner a cooling of the second turbine stage 22 is being insured, even if the transfer gaskets 52, 58 are damaged.

In order to protect the cooling system 85, 86, 88 from excessive pressures, the coolant line 85 is further connected by way of an additional line 106 with the bridging area 65, with an adjustable safety valve 104 being inserted in the line 106. The spring-loaded operating piston 108 of the safety valve is exposed to a plurality of surge chambers which are connected with the coolant line 85 and with the bridging area 65 by way of lines 110. The chambers are connected so that the safety valve 104 will open and transfer the excess pressure by way of line 106 to the bridging area 65 when a pre-set pressure difference is being exceeded. It is also possible to set the valves 98 and 104 by hydraulic, electrohydraulic or electric elements in place of the pneumatic elements illustrated here. From the line 43, leading to the compressed-air source 200, a line 116 branches off. From the line 116 branches off three supply lines 118, (illustrated by a segmental line) with cutoff units 120 placed within each line. The first supply line leads to the compressed-air intake 122 of the first combustion chamber 30; the second leads to a fitting 124 at the second combustion chamber 68; and, the third leads to an annular chamber 126. The annular chamber 126 surrounds the area of outflow from the second turbine stage 22 and is provided with apertures (not shown) directed at the last set of guide vanes of this stage. The system of lines 116, 118 makes it possible to supply the individual turbine stages and the last set of guide vanes with compressed air from the pipe line 43 after a turbine cutoff, that is after the closing of the valve 42 and the interruption of the fuel supply. This makes it possible to dissipate the windage heat generated during the deceleration of the turbine.

It will often be sufficient to apply the compressed air to one region only, for example by way of the annular chamber 126. The cutoff units 120 of the other segmental lines will then remain closed. It is also possible to omit the installation of supply lines that are not required. Obviously, the cutoff units 120 will remain closed throughout the turbine operation.

During operation, the first combustion chamber 30 is being supplied with a gaseous or a liquid fuel by way of the fuel supply line 32 and the fuel nozzle 34 while the air of combustion is drawn from the air storage tank 200. The air reaches the combustion chamber by way of line 43, the compressed-air supply line 40, the air space 38 as well as the air-supplying apertures 36. The hot power gases, produced in the first combustion chamber 30, are then fed into the first turbine stage 24 through the transition piece 44 and the power gas intake 46. The power gases, after leaving this stage, will enter the bridging area 65 and will then reach the second combustion chamber 68 by way of the second air space 67. The chamber 68 is supplied with fuel in the same manner as the first combustion chamber 30.

Since the power gases arriving from the first turbine stage 24 have sufficient oxygen for a further combustion, there will be no need to supply the second combustion chamber 68 with additional air of combustion. The power gases which are newly formed in the chamber, are then fed by way of a transition piece and a power gas intake into the second turbine stage 22 and will finally reach the passage 18 in the form of exhaust gases. On their way through the passage 18 the exhaust gases will transfer heat to the heat exchanger 84.

One portion of the compressed air is tapped at the compressed-air supply line 40 and is conveyed by way of the pressure-medium pipe line 82 to the single unit of volume 48, 50 in the form of cooling air. The cooling air is preheated in the heat exchanger 84.

The components bordering the single unit of volume 48, 50, such as the supports of the entrance blades, the power gas intake 46, the transition piece 44, the shaft 10 and the supports 53 for the first transfer gasket 52 are supplied with the cooling air, and are thereby cooled. The pre-heating of the cooling air by the heat exchanger 84 has the effect that thermal stresses are kept to a minimum.

Since the flow resistance of the fluid pressure pipe line 82 (from the compressed air supply line 40 to the single unit of volume 48, 50) is lower than the flow resistance encountered by the air required for combustion on its way through the air space 38 up to the combustion chamber 30, a higher pressure will arise within the single unit of volume 48, 50 than within the first combustion chamber and the transition piece 44. Air will therefore flow through the slot 77 of the first throttle into the space 62, and from there will flow through the air gap 60 into the transition piece 44.

At the same time air will flow from the air space 38 through the slot 79 of the second throttle into the space 62 and through the air gap 60 into the combustion chamber 30 (see arrows 112 in FIG. 2). This movement of air is intensified by the funnel-shape of the partition 73 and by the passing of the power gas from the combustion chamber 30 into the transition piece due to an injector effect (arrow 114). In this manner the air space 38 and the single unit of volume 48, 50 are being isolated from each other without the use of physical barriers. The passage from the combustion chamber 30 to the transition piece 44 is thereby cooled off.

At the same time cooling air will enter the first turbine stage 24 through the transfer gasket 45, with the transfer gasket 45 sealing the boundaries of the power gas intake 46 against the shaft 10.

In order to equalize the axial thrust which is generated by the turbine stages and which is directed toward the left, the fluid pressure chambers 50, 54 and 56 are connected with each other by way of the transfer gaskets 52 and 58. Since the second fluid pressure chamber 54 is connected with the cooling system 85, 86, 88 of the second turbine stage 22, one portion of the coolant, that is air, will flow from the fluid pressure chamber 54 to the cooling system 85, 86, 88. Coolant will also flow from the last fluid pressure chamber 56 through line 94 to the exhaust passage 18.

The slots of the transfer gaskets 52 and 58 are dimensioned in such a manner that the pressure difference arising between the individual balance pistons and acting upon the piston areas will be of such magnitude that the piston force directed toward the right will balance, or at least substantially balance, the axial thrust which is directed toward the left.

The effective area of the first balance piston 26 is preferably dimensioned so that the area in conjunction with the pressure existing within the first fluid pressure chamber 50 will equalize the thrust of the first turbine stage 24, while the thrust of the second turbine stage 22 is matched by the positive pressure within the second fluid pressure chamber 54 in conjunction with the second balance piston 28. The diameter of the piston 28 is selected in alignment with the second turbine stage.

Due to such an arrangement, the axial bearing 16 is being relieved of its stresses to a great extent and can be designed in a more simplified manner. Since the pressure within the fluid pressure chambers 50, 54 and 56 is maintained by withdrawing compressed air from the pipe line 40 supplying the combustion chamber 30 with compressed air, the pressure within the fluid pressure chambers will adjust automatically to any changes in operating conditions so that the axial thrust balance will always be maintained even in case of fluctuating operations.

The cooling air withdrawn from the second fluid pressure chamber 54 is delivered to the cooling system 85, 86, 88 of the second turbine stage. This cooling air is flowing through the annular chamber 86, cooling the bases of the stationary entrance blades of the second stage, while another portion of the cooling air is flowing to the annular groove 88, cooling the intake area, the area around the shaft and the guide vanes of the second stage 22.

The by-pass valve 98 will insure a direct supply of cooling air for the cooling system of the second turbine stage if the pressure difference within the cooling system falls below a specific value, with the by-pass value being set at this value. Such condition could occur if the cooling air supply for the cooling system 85, 86, 88 becomes insufficient due to damages at the transfer gasket 52 or leakages, resulting in a pressure drop within this system.

The safety valve 104 will keep dangerous excess pressures away from the cooling system by channeling such pressures to the bridging area 65. Any remaining thrust acting upon the axial bearing 14 can be modified within certain limits by a change of the pre-set pressure difference.

When the turbine is shut off, at least one of the cutoff units 120 is opened, preferably automatically, with the result that compressed air is withdrawn by way of pipe lines 43 and 116 from the air storage tank 200 or some other source, and fed into the turbine stages as well as to the last set of guide vanes. The compressed air will absorb the heat generated during the deceleration of the turbine and will dissipate it by way of the exhaust passage 18.

In most cases one of the supply lines 118 will be sufficient for the supply of the cooling air so that the other supply lines can be omitted.

The preferred embodiment of the present invention described the main advantages of the gas turbine proposed by the invention, namely to attain, through a small increase in components and materials an efficient cooling of turbine parts under high thermal stresses and at the same time a balancing of thrust forces even under the fluctuating operation conditions, and where the pre-heating of the coolant contributes substantially to the reduction in thermal stresses.

The invention which is intended to be protected herein has been described by way of a preferred embodiment and is not to be construed as limited to the particular forms disclosed, since these are intended to be regarded as illustrative rather than restrictive. Variations and changes may be made by those skilled in the art without departing from the spirit of the present invention.

What is claimed is:

1. A gas turbine engine, comprising:
    a first turbine stage having a first power fluid intake means for supplying a hot power fluid flow through the first turbine stage;
    balance piston means for equalizing an axial thrust of the gas turbine engine;
    first and second pressurized fluid chambers located adjacent to first and second sides of the balance piston means respectively;
    means for introducing a fluid at a first predetermined pressure into the first pressurized fluid chamber;
    means for introducing a fluid at a second predetermined pressure into the second pressurized fluid chamber, the second pressure being less than the first pressure;
    the first power fluid intake means being adjacent to the first pressurized fluid chamber with the hot power fluid therein at a pressure lower than the pressure of the first pressurized fluid chamber; and
    first transfer gasket means for maintaining a pressure difference between the first and second chambers, the gasket means coacting with the balance piston means.

2. The gas turbine engine of claim 1 further comprising:
    fluid cooling means for cooling the first stage of the gas turbine, the fluid cooling means supplying a coolant fluid to the means for introducing a fluid at the first predetermined pressure into the first pressurized fluid chamber.

3. The gas turbine engine of claim 2, wherein:
    the balance piston means include at least one balance piston.

4. The gas turbine engine of claim 3 further comprising:
    additional turbine stages;

additional balance pistons; and, additional pressurized fluid chambers arranged in series, each additional chamber being adjacent to one of the additional balance pistons, the additional chambers being separated from each other by additional transfer gaskets which each co-act with one of the additional balance pistons; and wherein:

the fluid cooling means communicates with one of the additional pressurized fluid chambers; and, slots of the additional transfer gaskets are predetermined to maintain a pressure difference between the pressurized fluid chambers which will at least partially equalize the axial thrust.

5. The gas turbine engine of claim 4, wherein:
the fluid cooling means cools at least one of the additional turbine stages arranged successively to the first turbine stage.

6. The gas turbine engine of claim 4, wherein:
the fluid cooling means includes a plurality of cooling circuits, each circuit communicating with one of the additional turbine stages and one of the additional pressurized fluid chambers.

7. The gas turbine engine of claim 6, wherein:
each of the cooling circuits communicates with a successively arranged pressurized fluid chamber.

8. The gas turbine engine of claim 6, wherein:
each of the cooling circuits communicates with one of the pressurized fluid chambers which is partially formed by two adjacent balance pistons; and,
the last pressurized fluid chamber is connected with an exhaust passage.

9. The gas turbine engine of claim 8, further comprising:
a heat exchanger provided within the exhaust passage and communicating with the first pressurized fluid chamber and the compressed air supply pipe line for the pre-heating of the air.

10. The gas turbine engine of claim 4, wherein:
an effective area of the first balance piston compensates for the axial thrust of the first turbine stage, and the effective area of each additional balance piston compensates for the axial thrust of each additional turbine stage.

11. The gas turbine engine of claim 2, wherein:
the fluid cooling means includes at least one adjustable safety valve which will open when a pre-set pressure difference between the fluid cooling means and a bridging area is being exceeded, and where the bridging area connects two turbine stages.

12. The gas turbine engine of claim 11, wherein:
the fluid cooling means includes at least one adjustable by-pass valve which is inserted within a pipe line connecting the fluid cooling means with a pressurized fluid pipe line and which will open if the pressure difference between the fluid cooling means and the bridging area falls below a pre-set value.

13. The gas turbine engine of claim 1, wherein:
the first transfer gasket means includes a gasket having a slot of a predetermined size to maintain the pressure difference between the first and second chambers.

14. The gas turbine engine of claim 1, wherein:
the first pressurized fluid chamber together with an area surrounding the first turbine stage communicates freely with one another to define a single volume.

15. The gas turbine engine of claim 14, wherein:
the power fluid is produced for use in the first turbine stage within at least one air-cooled first combustion chamber arranged at a turbine housing, the single volume being traversed by a transition member leading to the first power fluid intake means of the first turbine stage and surrounding an open end of the first combustion chamber while forming an air gap; and,
the single volume is sealed off by at least two throttles from an air space surrounding the first combustion chamber and chargeable with the air of combustion, said throttles being arranged in series inside the air space.

16. The gas turbine engine of claim 15, wherein:
a first throttle, adjacent to the single volume includes a flat, annular body which embraces, and is fastened to the transition member and engages a ring-gap of an outer ring and outer wall of the air space, said outer ring consisting of at least two ring segments which are joined together by a connecting ring.

17. The gas turbine engine of claim 16, wherein:
a second throttle has a second throttle gap which is formed between a wall of the combustion chamber and a cylindrical hollow body surrounding the combustion chamber wall and supported by an annular partition which traverses the air space and which is fastened to the outer wall of the air space.

18. The gas turbine engine of claim 17, wherein:
the hollow body is arranged between the wall of the combustion chamber and the widened upper end of the transition member.

19. The gas turbine engine of claim 1, wherein:
the hot power fluid is a hot gas produced in at least one combustion chamber, the first pressurized fluid chamber communicating with a pipe line which supplies compressed air to the combustion chamber of the first turbine stage.

20. The gas turbine engine of claim 1, further comprising:
means for supplying at least the first turbine stage and a final set of guide vanes of a final turbine stage with a gaseous coolant to dissipate windage heat produced by a deceleration of the turbine, the gaseous coolant being supplied after a cutoff of the power fluid supply to the first turbine stage.

21. The gas turbine engine of claim 20, further comprising:
an air storage tank, the coolant fluid consisting of compressed air which is withdrawn from the air storage tank.

* * * * *